(12) United States Patent
Buljina et al.

(10) Patent No.: US 10,738,786 B2
(45) Date of Patent: Aug. 11, 2020

(54) GEARED TURBO MACHINE

(71) Applicant: MAN ENERGY SOLUTIONS SE, Augsburg (DE)

(72) Inventors: Irhad Buljina, Oberhausen (DE); Stephan Faulhaber, Dortmund (DE)

(73) Assignee: MAN Energy Solutions SE, Augsburg (DE)

( * ) Notice: Subject to any disclaimer, the term of this patent is extended or adjusted under 35 U.S.C. 154(b) by 0 days.

(21) Appl. No.: 16/315,881

(22) PCT Filed: Mar. 17, 2017

(86) PCT No.: PCT/EP2017/056337
§ 371 (c)(1),
(2) Date: Jan. 7, 2019

(87) PCT Pub. No.: WO2018/007029
PCT Pub. Date: Jan. 11, 2018

(65) Prior Publication Data
US 2019/0162194 A1    May 30, 2019

(30) Foreign Application Priority Data

Jul. 7, 2016  (DE) ........................ 10 2016 112 453

(51) Int. Cl.
*F04D 25/04* (2006.01)
*F01D 15/08* (2006.01)
(Continued)

(52) U.S. Cl.
CPC ............. *F04D 25/04* (2013.01); *F01D 15/08* (2013.01); *F01D 15/12* (2013.01); *F02C 7/36* (2013.01);
(Continued)

(58) Field of Classification Search
CPC . F01D 15/08; F01D 15/12; F02C 7/36; F04D 25/04; F04D 25/163; F04D 29/5826; F04D 29/586; F28D 9/0006
See application file for complete search history.

(56) References Cited

U.S. PATENT DOCUMENTS 5,775,412 A * 7/1998 Montestruc, III .... F28D 9/0037
165/134.1
6,948,909 B2 * 9/2005 Meshenky .......... F02B 29/0412
165/125
(Continued)

FOREIGN PATENT DOCUMENTS

CA        2269731        10/1999
CN      203201825 U      9/2013
(Continued)

OTHER PUBLICATIONS

Translation DE 2161604.*
(Continued)

*Primary Examiner* — Jesse S Bogue
(74) *Attorney, Agent, or Firm* — Cozen O'Connor

(57) ABSTRACT

A geared turbo machine having a transmission, a drive assembly and multiple output assemblies. The transmission has a central bull gear and multiple pinions engaging into the bull gear. A first output assembly a two-stage main compressor in which a process gas is compressed using the mechanical drive power provided by the drive assembly a respective intermediate cooler is connected between two respective stages of the main compressor to cool the second process gas. A respective intermediate cooler is arranged between the last stage of the main compressor and a first output assembly and between two respective output assembly and an end cooler arranged downstream of the last. Each intermediate cooler and the end cooler has a respective housing with a supply connector and a discharge connector (Continued)

and a heat exchanger At least one intermediate cooler and/or the end cooler has a heat exchanger with a plate-type construction.

13 Claims, 3 Drawing Sheets

(51) Int. Cl.
  *F01D 15/12* (2006.01)
  *F04D 25/16* (2006.01)
  *F02C 7/36* (2006.01)
  *F28D 9/00* (2006.01)
  *F04D 29/58* (2006.01)

(52) U.S. Cl.
  CPC ....... *F04D 25/163* (2013.01); *F04D 29/5826* (2013.01); *F28D 9/0006* (2013.01); *F04D 29/586* (2013.01)

(56) References Cited

U.S. PATENT DOCUMENTS

| | | | | |
|---|---|---|---|---|
| 8,376,718 | B2 * | 2/2013 | Baker | F04D 25/16 417/243 |
| 9,279,612 | B2 * | 3/2016 | Bulijina | F25D 31/00 |
| 9,714,796 | B2 * | 7/2017 | Heinio | F28F 9/00 |
| 10,066,874 | B2 * | 9/2018 | Pitkanen | F28D 9/0012 |
| 2003/0059299 | A1 | 3/2003 | Miure | |
| 2006/0162918 | A1 | 7/2006 | Horiuchi et al. | |
| 2012/0263605 | A1 * | 10/2012 | DeMore | F04D 17/12 417/2 |
| 2014/0000841 | A1 * | 1/2014 | Baker | F25B 29/00 165/59 |
| 2015/0211539 | A1 * | 7/2015 | Wang | F25J 3/04018 415/1 |
| 2016/0040942 | A1 * | 2/2016 | Dziubinschi | F28F 9/005 165/135 |

FOREIGN PATENT DOCUMENTS

| | | | |
|---|---|---|---|
| CN | 204783131 U | 11/2015 | |
| DE | 21 61 604 | 6/1973 | |
| DE | 2161604 A1 * | 6/1973 | ............ F28F 9/0268 |
| DE | 10 2012 022 131 | 5/2014 | |
| DE | 20 2015 000883 | 3/2015 | |
| DE | 202015000883 U1 * | 3/2015 | ................ F02C 7/36 |
| EP | 1 010 954 | 6/2000 | |
| EP | 1 984 628 | 10/2008 | |
| EP | 2 604 862 | 6/2013 | |
| JP | 2003-075024 | 3/2003 | |
| JP | 2013-190140 | 9/2013 | |
| JP | 2015-137651 | 7/2015 | |
| WO | WO-0216852 A1 * | 2/2002 | ........... F28D 9/0043 |
| WO | WO 02/103263 | 12/2002 | |

OTHER PUBLICATIONS

Translation DE 202015000883.*
Office Action dated Dec. 31, 2020 issued in Chinese Patent Application No. 201780042352.5.
Anjun, J., "Fluid Flow Distribution Performance at Heat Exchanger's Entrance and its Optimization", China Doctoral Dissertations Full-Text Database, Engineering Science and Technology II, Issue 5, Nov. 15, 2007, p. 6.
Office Action dated Jan. 20, 2020 issued in Japanese Patent Application No. 2019-500240.
Office Action dated Feb. 18, 2020 issued in Korean Patent Application No. 10-2019-7002756.
Office Action dated Mar. 4, 2020 issued in India Patent Application No. 201947000095.

* cited by examiner

GEARED TURBO MACHINE

CROSS REFERENCE TO RELATED APPLICATIONS

This is a U.S. national stage of application No. PCT/EP2017/056337, filed on Mar. 17, 2017. Priority is claimed on German Application No. DE102016112453.2, filed Jul. 7, 2016, the content of which is incorporated herein by reference.

BACKGROUND OF THE INVENTION

1. Field of the Invention

The invention relates to a geared turbo machine.

2. Description of the Prior Art

From DE 10 2012 022 131 A1 a geared turbo machine having a transmission, a drive assembly, and having multiple output assemblies is known. The components of the geared turbo machine are integrated to form a machine train. The transmission comprises a central bull gear with a bull gear shaft, wherein multiple pinions mounted on pinion shafts mesh with the bull gear. The drive assembly preferentially is a steam turbine. The output assemblies are preferentially compressors, mainly a main compressor and multiple geared compressors.

From EP 2 604 862 A1 a further geared turbo machine having a drive assembly, a main compressor and multiple geared compressors is known. Furthermore, EP 2 604 862 A1 discloses coolers interacting with these compressors, namely intercoolers and an end cooler.

In the region of the intercoolers and of the end cooler of geared turbo machines, known from the prior art, fin tube bundle heat exchangers are used as heat exchangers. Such fin tube bundle heat exchangers have a relatively low pressure loss, but the heat transfer of such fin tube bundle heat exchangers is limited. In particular in the case of geared turbo machines with high outputs of more than 100,000 $Nm^3/h$, coolers of a relatively large design are therefore employed, which comprise suitably dimensioned fin tube bundle heat exchangers. However, in order to be able to provide economical geared turbo machines with high outputs, the coolers of the geared turbo machines have to be of a compact design. This has not been possible to date.

SUMMARY OF THE INVENTION

There is a need for a geared turbo machine requiring less installation space.

One aspect of the invention is based on creating a new type of geared turbo machine.

Each intercooler and the end cooler of the geared turbo machine according to one aspect of the invention have a housing each with an inlet connector for the second process gas to be cooled and an outlet connector for the second process gas to be cooled and a heat exchanger received in the housing. At least one intercooler and/or the end cooler comprise a plate-type heat exchanger.

In the geared turbo machine according to one aspect of the invention, plate-type heat exchangers are employed in the region of at least one cooler. Preferentially, fully-welded plate-type heat exchangers are employed. Such plate-type heat exchangers have a better heat transfer, so that the heat exchangers and thus ultimately the coolers can be embodied in a more compact manner. By way of this, a particularly compact design of a geared turbo machine can be provided.

According to a first advantageous further development, each intercooler and the end cooler comprise a plate-type heat exchanger. Such plate-type heat exchangers have a high heat transfer and can therefore be utilised for realising a particularly compact design of the geared turbo machine.

According to a second, alternative further development, at least one intercooler arranged between an axial stage of the first output assembly and a radial stage of the first output assembly comprises a plate-type heat exchanger. At least one further intercooler and/or the end cooler comprise/s a heat exchanger in fin tube bundle design. This further development of the invention, which in the region of at least one intercooler utilises a plate-type heat exchanger and in the region of another intercooler and/or of the end cooler, a heat exchanger in fin tube bundle design adapted to the respective cooling requirement of the respective cooler and ensure a compact design of the respective cooler and ensure a low pressure loss through the radiators across the entire geared turbo machine. Such a hybrid concept, which accordingly utilises both heat exchangers in fin tube bundle design as well as plate-type heat exchangers in the region of the coolers is particularly preferred.

Preferentially, plate elements of the respective plate-type heat exchanger are welded. This increases the efficiency of the cooling in the region of the respective cooler.

Preferentially, the housing of the respective cooler has a cylindrical or tubular casing wall, wherein the inlet connector and the outlet connector are positioned on the casing wall next to one another in an axial position of the casing wall. By way of this relative orientation of inlet connector and outlet connector, the relative cooler can be integrated in the geared turbo machine in a particularly space saving manner.

Preferentially, the housing of the respective cooler receives a flow equalising element positioned downstream of the inlet connector and upstream of the heat exchanger. This can be utilised for a further reduction of the size of the respective cooler and thus ultimately for reducing the space requirement of the geared turbo machine.

BRIEF DESCRIPTION OF THE DRAWINGS

Preferred further developments of the invention are obtained from the subclaims and the following description. Exemplary embodiments of the invention are explained in more detail by way of the drawing without being restricted to this.

There it shows.

DETAILED DESCRIPTION OF THE PRESENTLY PREFERRED EMBODIMENTS

Figure 1:
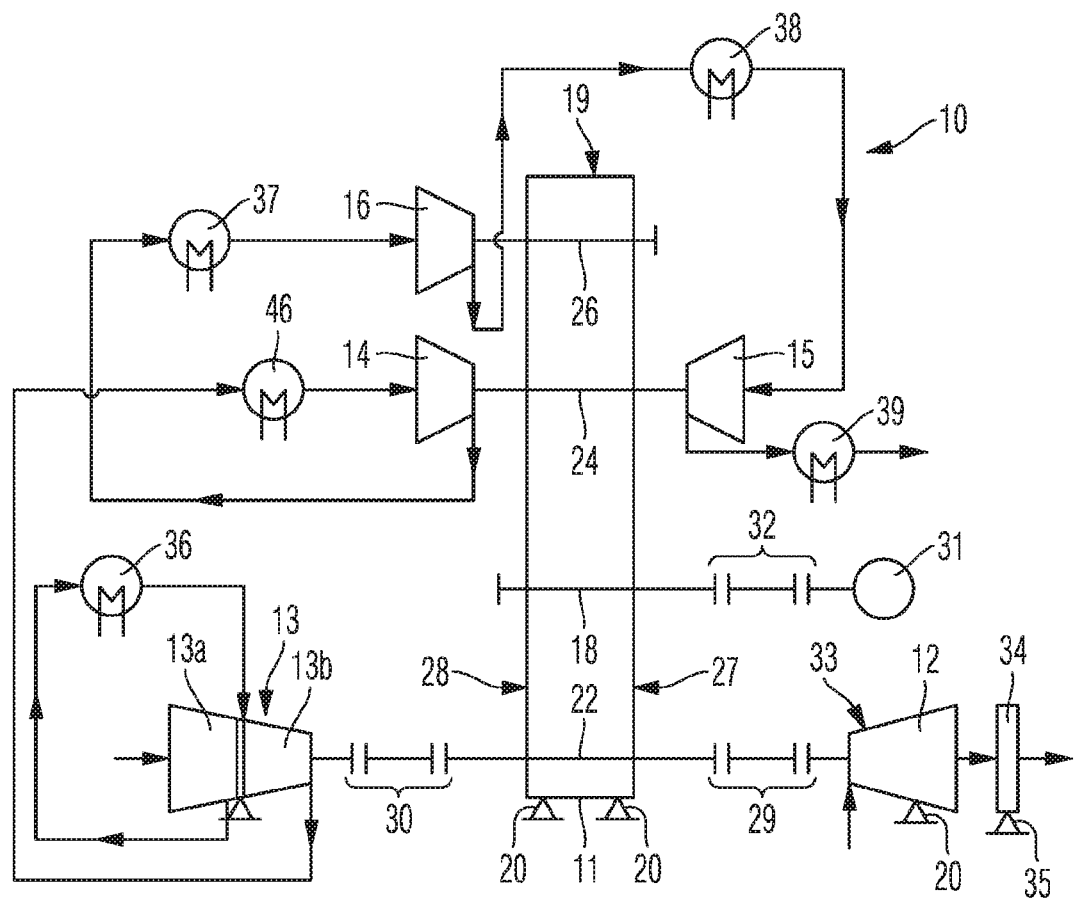
FIG. 1 is a block diagram of a geared turbo machine.
Figure 2:
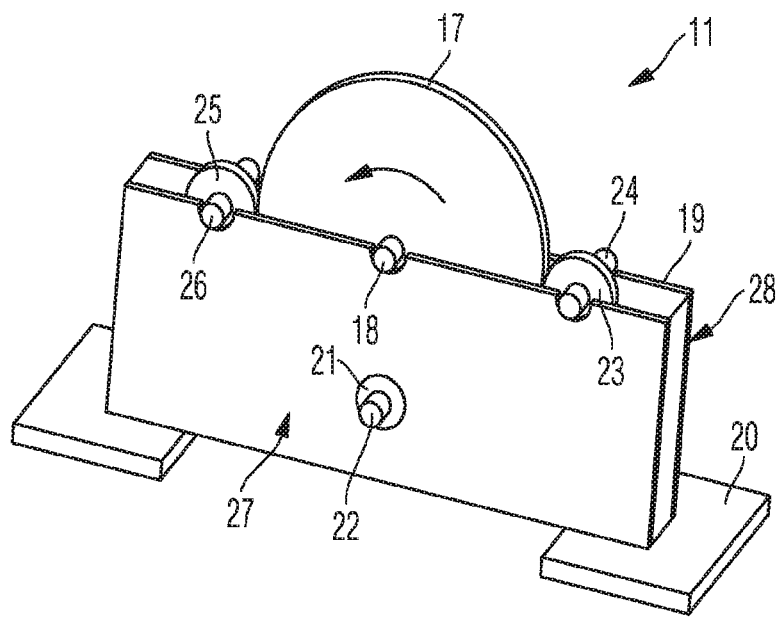
FIG. 2 is a schematised, perspective view of a transmission of the geared turbo machine according to FIG. 1.

FIGS. 1 and 2 show an exemplary embodiment of a geared turbo machine 10. The geared turbo machine 10 comprises an integrated transmission 11, a drive assembly 12, and multiple output assemblies 13, 14, 15, and 16. The transmission 11, the drive assembly 12, and the multiple output assemblies 13, 14, 15, and 16 are integrated to form a machine train.

The transmission 11 of the geared turbo machine 10 comprises a bull gear 17, which is positioned on a bull gear shaft 18 and the bull gear shaft 18 is rotatably mounted in a transmission housing 19 of the transmission 11. Multiple pinions 21, 23, 25, which are attached to pinion shafts 22, 24, 26 and via the pinions shafts 22, 24, and 26 are likewise rotatably mounted in the transmission housing, mesh with the bull gear 17 of the transmission 11 on the circumference of the same.

In the exemplary embodiment, a total of three such pinions 21, 23, and 25 mounted on pinions shafts 22, 24, and 26 mesh with the bull gear on the circumference of the bull gear 17.

The drive assembly 11 is designed as a steam turbine for providing mechanical drive power by expanding a first process gas. The drive assembly 12 is coupled to a first pinion shaft 22 of the transmission 11, namely on a first side 27 of the transmission 11 or of the transmission housing 19, wherein the drive assembly 12, designed as steam turbine, is coupled via a first clutch 29 to the first pinion shaft 22.

The multiple output assemblies 13, 14, 15, and 16 include a first output assembly 13 designed as main compressor as well as multiple second output assemblies 14, 15, and 16 designed as geared compressors. The main compressor or the first output assembly 13 is designed in at least two stages with the main compressor stages 13a, 13b, wherein in the main compressor utilising the mechanical drive power provided by the drive assembly 12 a second process gas is compressed.

The first output assembly 13 or the main compressor is likewise coupled to the first pinion shaft 22 of the transmission 11, namely on a second side 28 of the transmission 11 or transmission housing 19 located opposite the first side 27. Here, the first drive assembly 13 designed as a main compressor is connected to the first pinion shaft 22 via a second clutch 30, to which the drive assembly 12 is also coupled via the first clutch 29. In particular when the first clutch 29 and the second clutch 30 are both closed, the drive assembly 12 and the first output assembly 13 designed as main compressor can be operatively connected to one another directly without intermediate connection of a transmission stage of the transmission 11 so that the same rotate with the same rotational speed.

In addition to the drive assembly 12 and the first output assembly 13 designed as main compressor, the geared turbo machine 10 of FIGS. 1 and 2 comprises three second output assemblies 14, 15, and 16, which are designed as geared compressors. Only two or more than three geared compressors can also be present. In the second output assemblies 14, 15, and 16 designed as geared compressors, the second process gas is further compressed utilising the mechanical drive power provided by the drive assembly 12, wherein the second output assemblies 14, 15, and 16 are coupled to further pinion shafts 24, 26 of the transmission 11.

Accordingly, the three further, second output assemblies 14, 15, and 16 are coupled in the exemplary embodiment of FIGS. 1 and 2 to two further pinion shafts 24, 26, such that the two geared compressors 24 and 25 on opposite sides 27 and 28 of the transmission 11 or transmission housing 19, are coupled to a second pinion shaft 24 of the transmission 11, whereas the geared compressor 16 is coupled to a third pinion shaft 26 of the transmission 11, preferentially in the region of that side 28 of the transmission housing 19, on which the geared compressor 14 and the main compressor 13 are positioned as well.

The main compressor 13 is also referred to as a MAC compressor and is preferentially designed as a radial compressor. The first main compressor stage 13a of the main compressor 13 is preferentially an axial stage, the second main compressor stage 13b of the main compressor 13 is preferentially a radial stage.

The geared compressors 14, 15, and 16 are also referred to as boost compressors or BAC compressors. The geared compressors 14, 15, and 16 are preferentially radial compressors. The unit consisting of transmission 11 and radial geared compressors 14, 15, and 16 is also referred to as radial gear compressor or as a RG compressor.

In the exemplary embodiment of FIGS. 1 and 2, the first pinion shaft 22, together with the first pinion 21 mounted on the same, is positioned approximately in the six o'clock position of the bull gear 17 and, via the pinion 21, meshes with the bull gear 17 in this position. The second pinion shaft 24 with the pinion 23 is positioned approximately in the three o'clock position and the third pinion shaft 26 with the pinion 25 approximately in the nine o'clock position of the bull gear 17, wherein these pinions 23 and 25 mesh with the bull gear 17 in these positions.

As shown in FIG. 1a, an optional generator 31 or alternatively a motor can be coupled to the bull gear shaft 18 of the transmission 11 via a clutch 32.

As already explained, the first output assembly 13, designed as main compressor, is designed in multiple stages with multiple compressor stages, wherein in FIG. 1a two main compressor stages 13a, 13b are exemplarily shown.

The transmission 11, together with the geared compressors 14, 15, and 16, the drive assembly 12 designed as steam turbine and the first output assembly designed as main compressor are preferentially mounted on a common foundation table 20 of a machine foundation.

In the region of the steam turbine or of the drive assembly 12, an axial exhaust steam housing 33 is employed so that expanded first process gas leaves the steam turbine 12 in the axial direction.

A condenser 34 positioned downstream of the steam turbine 12 is then, seen in the direction of a longitudinal axis of the steam turbine, preferentially positioned next to the foundation table 12 of the machine foundation supporting the steam turbine 12, namely preferentially on separate supports 35.

As is evident from FIG. 1, the geared turbo machine 10 comprises multiple coolers 36, 37, 38, 39, and 46.

The cooler 36 is an intercooler which is connected between the two main compressor stages 13a, 13 of the main compressor 13.

The coolers 46, 37, and 38 are likewise intercoolers, namely in the case of the cooler 46 an intercooler between the second main compressor stage 13b and the first geared compressor 14, in the case of the cooler 37 an intercooler between the first geared compressor 14 and the second geared compressor 16 and in the case of the cooler 38 an intercooler between the second geared compressor 16 and the third geared compressor 15.

The cooler 39 is an end cooler downstream of the third geared compressor 15.

Each cooler 36, 37, 38, 39, 46 of the geared turbo machine 10 has a housing with a cylindrical or tubular casing wall 47, wherein on the casing wall 47 on the one hand an inlet connector 41 for the second process gas to be cooled in each case and an outlet connector 42 for the second process gas to be cooled are formed.

The casing wall 47 of the housing 40 of the respective cooler 36, 37, 38, 39, 46 defines a hollow space or interior space of the respective housing 40, in which a heat exchanger 43 is received, which is flowed through by the second process gas to be cooled and by a cooling medium.

In this hollow space defined by the housing 40, separating elements 45 are received, which separate the flow of the second process gas to be cooled from the flow of the already cooled second process gas in order to thereby ensure that second process gas to be cooled conducted via the inlet connector 41 is mandatorily conducted via the heat exchanger 43 before it can be discharged via the outlet connector 42 as cooled second process gas. Thus, intermixing of second process gas to be cooled and cooled second process gas within the respective cooler is avoided by the separating elements 45.

At least one cooler, namely at least one intercooler 36, 37, 38, 46, and/or the end cooler 39 comprises a plate-type heat exchanger 43, i.e. a plate heat exchanger. Such plate heat exchangers have a high heat transfer and thus allow an effective cooling of the second process gas with low installation space required.

In the shown, preferred exemplary embodiment, at least the intercooler 36, which is connected between the first main compressor stage 13, designed as an axial stage, and the second main compressor stage 13b, designed as radial stage, comprises a plate-type heat exchanger 43. In the region of this intercooler 36 there is a particularly high cooling requirement wherein this cooling requirement can then be provided while ensuring a particularly compact design of the intercooler 36.

It is possible to equip a further intercooler 38 and 46 as well as the end cooler 39 with plate heat exchangers 43.

However it is preferred to equip with plate heat exchangers only coolers in the region of which a high cooling output is required, and in the case of coolers, in which a relative low cooling output is required, utilise tube bundle heat exchangers since the same have a lower pressure loss than plate heat exchangers.

Accordingly, a configuration of the geared turbo machine 10 is particularly preferred, in which adapted to the needed cooling requirement of the respective cooler 36, 37, 38, 39, 46 while ensuring as compact as possible a design of the geared turbo machine 10 and ensuring as low as possible a pressure loss, in the region of the first cooler, plate heat exchangers are employed as heat exchangers and in the region of the second cooler, fin tube bundle heat exchangers are employed as heat exchanger. Such a hybrid concept for the coolers of the geared turbo machine is particularly preferred.

Figure 3A:
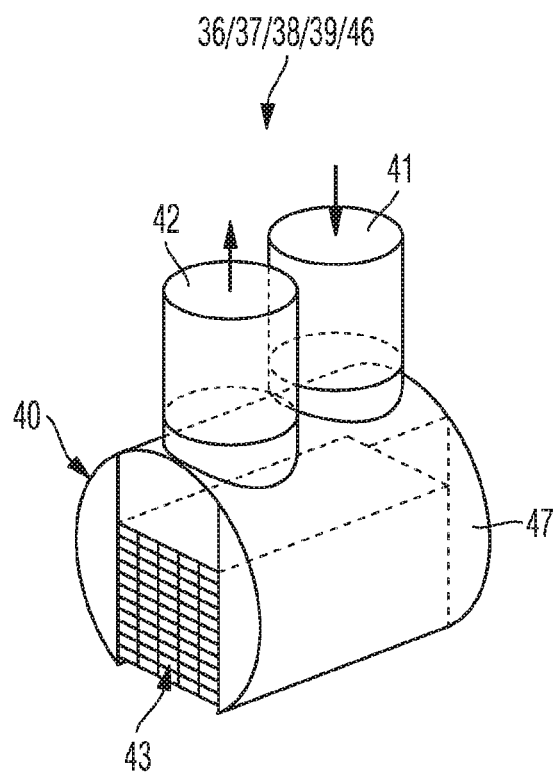
FIGS. 3a to 3c are different views of a first cooler of the geared turbo machine.
Figure 3B:
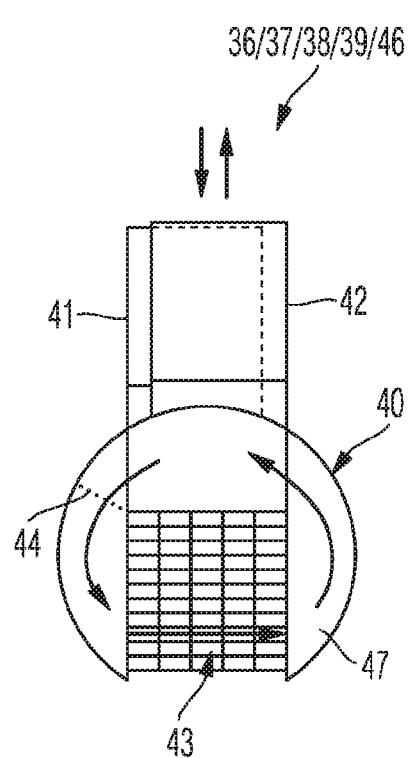
Figure 3C:
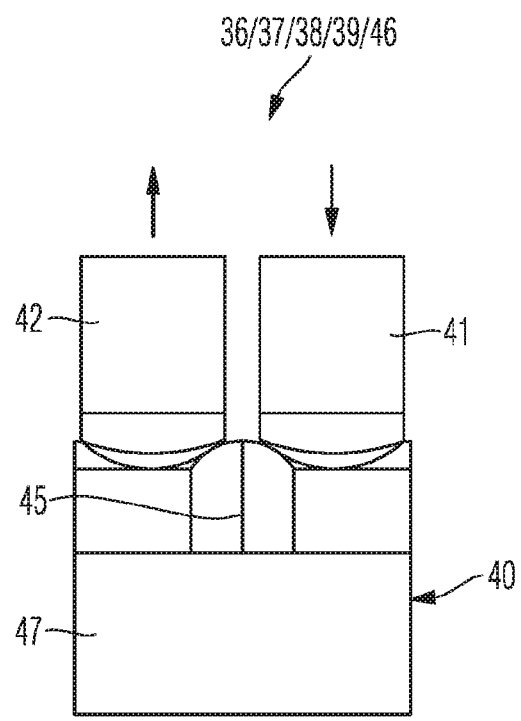
Figure 4A:
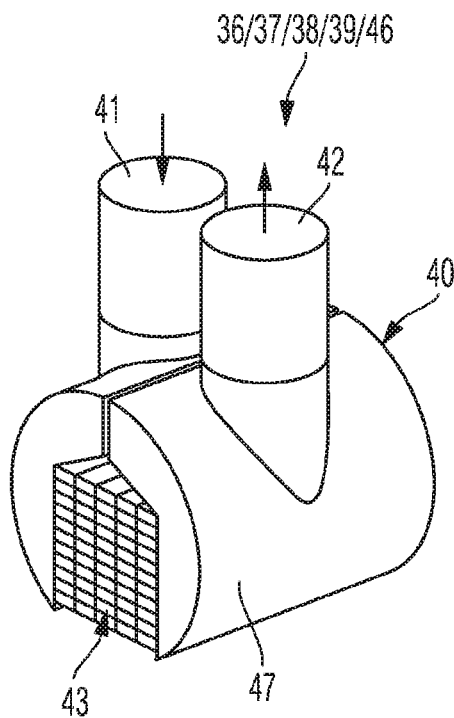
FIGS. 4a to 4c are different views of a second cooler of the geared turbo machine.
Figure 4B:
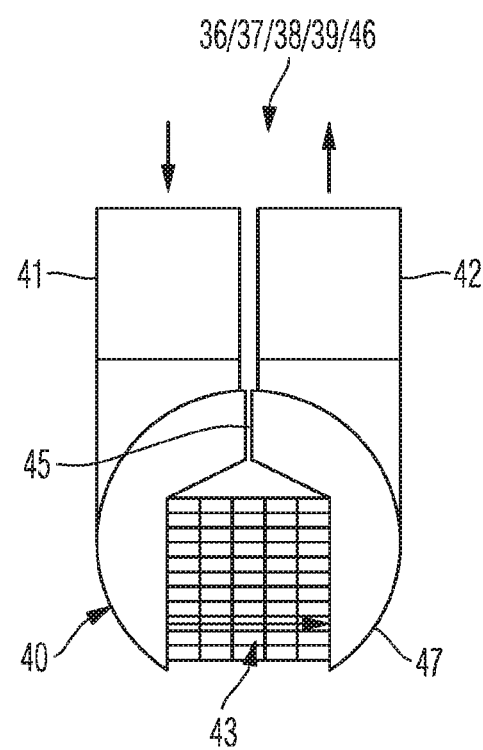
Figure 4C:
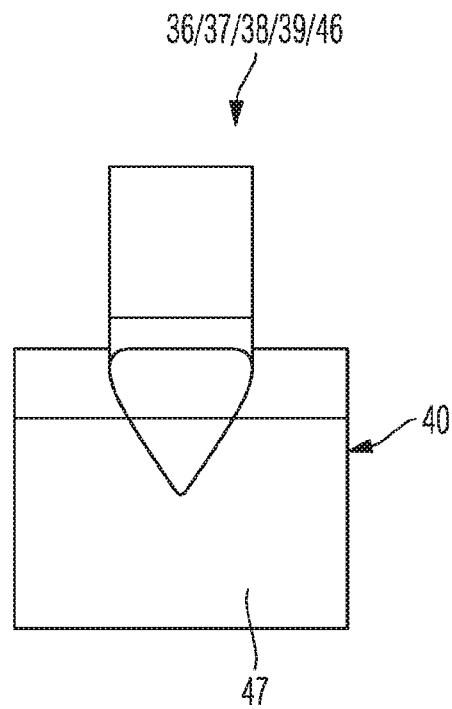

In the version of a cooler 35, 37, 38, 39, 46 shown in FIGS. 3a, 3b and 3c, inlet connectors 41 and outlet connectors 42 for the second process gas are positioned one after the other on the casing wall 47 in the axial position of the casing wall 47. Compared with this, FIG. 4a, 4b, 4c show a version in which the inlet connector 41 and the outlet connector 42 are positioned in an axial position of the casing wall 47 next to one another on the same. By way of this, the desired relative position of the respective cooler compared with the other assemblies of the geared turbo machine can be adapted in order to ensure a particularly compact design of the geared turbo machine.

From FIG. 3b it is evident that the housing 40 of the cooler shown there receives a flow equalising element 44 which is arranged downstream of the inlet connector 41 and upstream of the respective heat exchanger 43. Such a flow equalising element 44 can be a plate-like perforated sheet that ensures that the entire heat exchanger 43 is evenly flowed through by the second medium to be cooled. By way of this, the effectiveness of the cooling can be increased and the installation space of a cooler further reduced.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A geared turbo machine, comprising:
   a transmission, comprising:
   a central bull gear;
   a bull gear shaft for the central bull gear; and
   multiple pinions meshing with the central bull gear each having a respective pinion shaft;
   a drive assembly configured as a steam turbine, in which a first process gas is expanded to provide mechanical drive power via a one of the multiple pinions meshing with the central bull gear; and
   a plurality of output assemblies comprising:
   a first output assembly configured as at least a two-stage main compressor that uses the mechanical drive power provided by the drive assembly to compress a second process gas;
   an intercooler connected between each two stages of the first output assembly;
   multiple second output assemblies configured as geared compressors that use the mechanical drive power provided by the drive assembly to further compress the second process gas; and
   a respective intercooler arranged between a last stage of the first output assembly and a first geared compressor and between two geared compressors; and
   an end cooler arranged downstream of a last geared compressor;
   a respective housing for each intercooler and the end cooler, each housing having a substantially cylindrical or substantially tubular casing wall, end walls at longitudinal ends of the cylindrical or tubular casing wall, an inlet connector for the second process gas, and an outlet connector for the second process gas the inlet connector and outlet connector are disposed in the cylindrical or tubular casing wall; and
   a heat exchanger received in the respective housing,
   wherein at least one intercooler and/or the end cooler comprises a plate-type heat exchanger having an input and an output configured for a flow path that is perpendicular to a longitudinal axis of the cylindrical or tubular casing wall,
   wherein the cylindrical or tubular casing wall of each housing is spaced apart from the input and the output of the plate-type heat exchanger, and the input and output are disposed on opposite end walls, wherein the input and the output of the plate-type heat exchanger are perpendicular to the inlet connector for the second process gas and the outlet connector for the second process gas, wherein the transmission, the drive assembly, and the plurality of output assemblies are integrated to form a machine train; wherein a bottom plate of the plate-type heat exchanger forms a portion of the substantially cylindrical or substantially tubular casing wall.

2. The geared turbo machine according to claim 1, wherein each intercooler and the end cooler comprises a plate-type heat exchanger.

3. The geared turbo machine according to claim 1, wherein at least one intercooler between an axial stage of the first output assembly and a radial stage of the first output assembly comprises a plate-type heat exchanger.

4. The geared turbo machine according to claim 1, wherein at least one further intercooler and/or the end cooler comprises a fin tube bundle heat exchanger.

5. The geared turbo machine according to claim 4, wherein at least one further intermediate cooler and/or the end cooler comprises a plate-type heat exchanger.

6. The geared turbo machine according to claim 1, wherein plate elements of the plate-type heat exchanger are welded.

7. The geared turbo machine according to claim 1, wherein the inlet connector and the outlet connector are positioned on the casing wall one behind the other in an axial direction of the casing wall.

8. The geared turbo machine according to claim 1, wherein the inlet connector and the outlet connector are positioned next to one another on the casing wall in an axial position of the casing wall.

9. The geared turbo machine according to claim 1, wherein the housing of the respective cooler receives a flow equalising element positioned downstream of the inlet connector and upstream of the heat exchanger.

10. The geared turbo machine according to claim 9, wherein the flow equalising element is a plate-like perforated sheet.

11. The geared turbo machine according to claim 1, wherein the drive assembly is coupled to a same pinion shaft as the first output assembly.

12. The geared turbo machine according to claim 3, wherein the drive assembly is coupled to the same pinion shaft as the first output assembly via one or more clutches.

13. The geared turbo machine according to claim 2, wherein the drive assembly and the first output assembly rotate with a same rotational speed.

* * * * *